United States Patent
Zavodchikov et al.

(10) Patent No.: US 6,368,429 B1
(45) Date of Patent: Apr. 9, 2002

(54) METHOD OF MANUFACTURING ZIRCONIUM ALLOY TUBES

(75) Inventors: Sergei Jurievich Zavodchikov; Elena Nikolaevna Aktuganova, both of Glazov; Oleg Viktorovich Bocharov; Viktor Fedorovich Bukhovtsev, both of Moscow; Vladimir Andreevich Kotrekhov, Glazov; Anatoly Frantsevich Lositsky, Glazov; Jury Pavlovich Shevnin, Glazov; Antonina Vasilievna Nikulina, Moscow; Vladimir Fedorovich Seliverstov, Glazov, all of (RU)

(73) Assignee: Joint Stock Company "Chepetsky Mechanical Plan" (RU)

( * ) Notice: Subject to any disclaimer, the term of this patent is extended or adjusted under 35 U.S.C. 154(b) by 0 days.

(21) Appl. No.: 09/392,063

(22) Filed: Sep. 8, 1999

Related U.S. Application Data

(63) Continuation of application No. PCT/RU97/00316, filed on Oct. 2, 1997.

(51) Int. Cl.$^7$ .................................................. C22F 1/18
(52) U.S. Cl. ....................................... 148/672; 148/519
(58) Field of Search .................................. 148/672, 421

(56) References Cited

U.S. PATENT DOCUMENTS

| | | | |
|---|---|---|---|
| 4,584,030 A | * 4/1986 | McDonald et al. | 148/672 |
| 4,649,023 A | 3/1987 | Sabol et al. | |
| 5,125,985 A | * 6/1992 | Foster et al. | 148/672 |
| 5,437,747 A | * 8/1995 | Adamson et al. | 148/519 |
| 5,735,978 A | * 4/1998 | Mardon et al. | 148/672 |

FOREIGN PATENT DOCUMENTS

| | | |
|---|---|---|
| FR | 2 584 097 | 1/1987 |
| RU | 2032760 | 4/1995 |
| RU | 2037555 | 6/1995 |

OTHER PUBLICATIONS

E. Ross Bradley and George P. Sabol, editors, Zirconium in the Nuclear Industry, Eleventh International Symposium Pages 74 to 91, 1996.*
I. L. Perlin, L. H. Reitbarg. Theory of Metal Pressing. 1975, p. 350. (partial translation).
G. V. Filimonov, O. A. Nikishov. Pilgering of Zirconium Tubes. 1988, p. 26. (partial translation).

* cited by examiner

*Primary Examiner*—John P. Sheehan
(74) *Attorney, Agent, or Firm*—Graybeal Jackson Haley LLP

(57) ABSTRACT

The present invention relates to a method for producing tubing products from binary and multicomponent zircon alloys, consisting in obtaining from an ingot previously submitted to a beta distortion process p source preparation, hot forming said source preparation at the subsistence temperature of zirconium alpha+beta to get a tubular blank hardenning the latter at a temperature higher by 30 to 60° to the temperature at which the alloy passes from an intermediary state zirconium alpha+beta to the beta state of zirconium, mechanically processing, following by a tempering process at the subsistence temperature of alpha zirconium until the finished product is obtained, the cold distortion of the tubular product being effected with the following global stretching: $\mu_\Sigma > 100$ for the finished products and $\mu_\Sigma < 50$ for the TREX or SUPER TREX-type semi-finished tubular products, whereby at the first stage of the cold distortion the stretching $\mu < 2.0$, $\mu = S_{prod}/S_{tub}$ (where $S_{prod}$ is the cross-sectional surface of the product before the milling process and $S_{tub}$ is the cross-sectional surface of the laminated tube) and $\mu = S_{source\ material}/S_{finished\ tube}$ (where $S_{source\ material}$ is the cross-sectional surface of the blank before the first milling process and $S_{finished\ tube}$ is the cross-sectional surface of the finished tube after the last milling process).

10 Claims, 4 Drawing Sheets

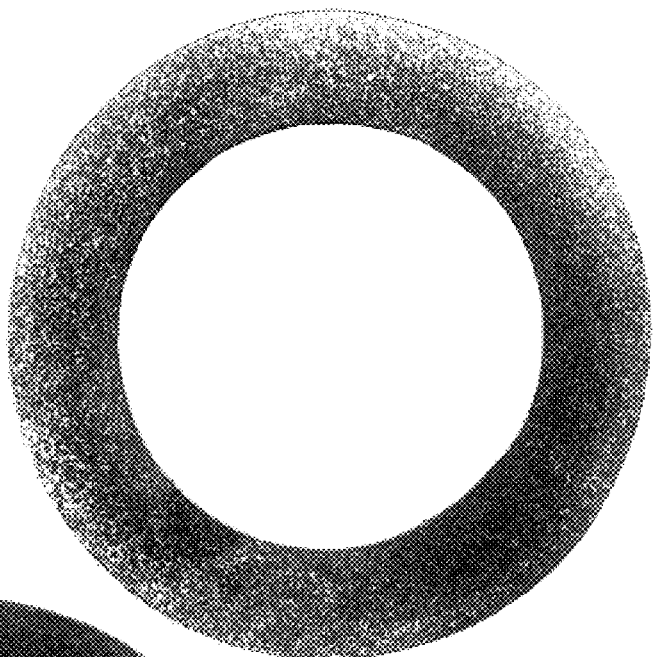
FIG. IA
FIG. IB
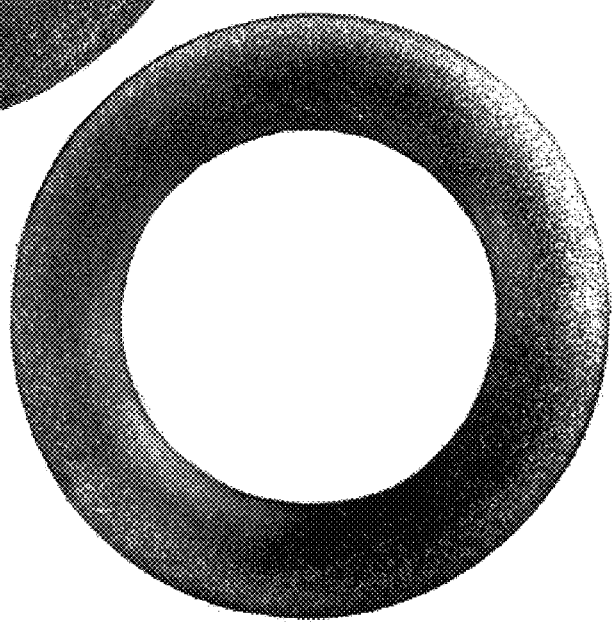
FIG. 2A

METHOD OF MANUFACTURING ZIRCONIUM ALLOY TUBES

This is a continuation-in-part of co-pending International Application PCT/RU97/00316 filed on Oct. 2, 1997 designating the United States.

THE FIELD OF THE INVENTION

The invention relates to the field of metallurgy, rolling production and is meant, in particular for manufacturing intermediate and final products of zirconium alloys.

The known method of the production of zirconium alloy items (RU Patent No. 2,037,555, C22F/18, 1995.), includes hot deformation of the billet, preliminary cold deformation and vacuum annealing at 560–590° C. with the isothermic time interval of 3 to 4 hours, cold rolling with 17 to 31% of the degree of deformation at the last passing and subsequent final vacuum annealing at 560–585° and isothermic time interval of 5 to 7 hours.

Technique which conforms the closest with the present application includes the following sequence of operations: the manufacturing of an ingot, its preliminary β-processing, the production of a billet by means of hot molding at the temperature of α-zirconium existence, the annealing of the billet at the temperature of 380 to 650°, the cold deformation of the billet with intermediate annealings at the temperature of α-zirconium existence and finishing of the billet to get the ready product (US. Pat. No. 4,649,023, CI. C22C 16/00, 1987.), as well as the method differing from the above mentioned by the following peculiarities:

after β-processing before hot molding of the ingot the billet is annealed at the temperature of 380° C. to 650° C.:

before the annealing after the hot molding the billet is treated by quenching at the temperature of 920° C. to 1070° C., the said annealing being performed at the temperature of 380° C. to 520° C.;

the quenching is performed at the rate of 60° C./s to 1000° C./s (RU Patent No. 2,032,760, C22F 1/18, 1995.).

It is well-known in the art that zirconium alloy tubes of the final size are produced by means of the cold rolling from the specially manufactured thick-wall tube intermediate product having high performance mechanical properties and precise geometric dimensions, which is termed SUPER-TREX or TREX in foreign references (E. Ross Bradley and George P. Sabol, editors. Zirconium in the Nuclear Industry: Eleventh International Symposium ASTM Publication Code Number (PCN): 04-012950-04 ASTM 100 Barr Harbor Drive West Conshohocken, Pa. 19428-2959). The geometric dimensions of the most common intermediate products are 63.5×10.9 mm, 44.5×7.62 mm.

There is a known method of production of cladding tubes from zirconium alloys with the use of intermediate products 63.5×10.9 and 44.5×7.62 mm, this method allowing only produce high-quality cladding tubes with the degree of deformation 51% after one cold rolling pass, the value of 80% resulting in the formation of numerous cracks (FR Patent No. 2,584,097, 1987. C22 F I/18:c22 16/00.).

DISCLOSURE OF THE INVENTION

The applied invention solves the task of the improvement of quality of zirconium alloy articles by the provision of deformation conditions without the disturbance of the continuity of the material of articles, obtaining the uniform metal structure along and across the articles and the improvement of technical and economic factors of their production by means of the increase of the dimensions of the initial billets and the improvement of the quality of tube intermediate products.

The outlined aim is achieved by the fact that for manufacturing tubes and intermediate tube intermediate products of SUPER-TREX, TREX and binary zirconium alloys in addition to the previously known operations:

manufacturing of an ingot, its preliminary β-deformation processing before the production of the initial billet, manufacturing of the tubular billet by means of hot molding of the initial billet at the temperature of the existence of α-zirconium, cold deformation of the tubular billet with intermediate annealings at the temperature of the existence of α-zirconium, finishing of the billet to get the ready article.

The cold deformation of tubes is performed at the total reduction of $\mu_\Sigma > 100$ for manufacturing ready articles or $\mu_\Sigma < 50$ for manufacturing tubular intermediate products of SUPER-TREX, TREX TYPES, the reduction being $\mu < 2.0$ at the first stage of tube rolling, and the final tube annealing is performed at the temperature of the existence of α-zirconium, and $\mu = S_{billet}/S_{tube}$ where $S_{billet}$ is the cross section area of the rolling billet, $S_{tube}$ is the cross section of the rolled tube;

$\mu = S_{init.\ billet}/S_{ready\ tube}$ where $S_{init.\ billet}$ is the area of the cross section of the billet for the first rolling, $S_{ready\ tube}$ is the area of the cross section of the ready tube after the last rolling.

In case it is necessary to get the final size tubes or intermediate products of SUPER-TREX, TREX types of multi-component zirconium alloys or binary zirconium alloys, when it is necessary to get the articles of the improved quality (with the orientation of hydrides Fn<0.3 in any portion of the tube, stable texture and/or other requirements), in addition to the operations mentioned in the first variant of the claimed method, after hot molding at the temperature of the existence of α- or (α+β)-zirconium, the tubular billet is annealed at the temperature exceeding by 30 to 60° C. the temperature of transition of the alloy from the intermediate (α+β) phase to β-phase zirconium, the mechanical processing and the subsequent tempering-of the quenched billet at the temperature of the existence of α-zirconium.

The conducting of cold rolling of tubes at the total reduction of $\mu_\Sigma > 100$, by means of a higher degree of metal working allows to get the ready articles with the uniform structural condition in length and cross section.

The suggestion limitation of the reduction value at the first stage of rolling results in the decrease of shearing stresses occurring during the deformation of billets in cold rolling nulls well below the values of the tensile strength of zirconium alloys having been exposed to the above mentioned thermal treatment, both multi0component and more plastic, binary ones, resulting in the deformation of the alloys without disturbance of the continuity. At the subsequent stages of rolling the reduction is increased due to the rise of the plasticity of the alloys after the first state of rolling and the subsequent annealing. In case of the manufacturing of the tubular intermediate products of SUPER-TREX or TREX types the total reduction during the cold rolling can be $\mu_\Sigma < 50$ (because the intermediate products are usually manufactured in 1 to 3 passing cold rolling as distinct from the final size tubes for which the number of passings can be as much as 5 to 8 and taking into account limitations of reduction at the first stage of the cold rolling $\mu<2.0$).

The conducting of the quenching of tubular billets after the hot molding at the temperature exceeding by 30 to 60° C. the temperature of transition of the alloy from the intermediate ($\alpha+\beta$) phase to the $\beta$-phase of zirconium, mechanical processing and tempering of the quenched billet at the temperature of the existence of $\alpha$-zirconium provides the complete phase recrystallization of the alloys and their transformation into the structural condition of martensite type with fine-grained (grain size being 0.16 to 0.22 mm) macrostructure and with the maximum dispersion of intermetallic and admixture phases with the fixation of admixture and alloy components in the satiated solid solution (FIG. D). Besides the thermal treatment provides more than twofold reserve of the alloy plasticity for the first stage of the cold rolling as compared with the previous method (Table on page 9), and in the combination with the limitation of the reduction value during the first stage of the cold rolling it predetermines the conducting of the cold deformation without micro- and macrofailures (FIG. 2). The claimed deformation and thermal treatment allow to obtain the uniform structure in length and cross section of the pressed billet (FIG. 4). In previous methods the pressed billet has non-uniform structure in length and cross section (FIG. 3) due to peculiarities of the process of direct pressing (I. L. Perlin, L. H. Reitbarg. Theory of Metal Pressing. Moscow. Metallurgy, 1975, p. 350), which is inheritedly maintained up to the production of the tubes of final size. Machining of the quenched tubular billet provides the removal of the superficial oxidized and saturated with gas layer which is formed after the quenching and simultaneously it allows to remove defects on the outer and inner surfaces of the billet which appear in the process of the hot molding. The improvement of the quality of the billet surface allows to avoid the deterioration of plastic properties of the metal (G. V. Filimonov, NikishovPilgering of Zirconium Tubes, Moscow, Metallurgy, 1988, p. 26) and to exclude the conditions of the disturbance of continuity due to the superficial defects during the subsequent cold deformation.

THE BRIEF DESCRIPTION OF FIGURES

The applied invention is provided with illustrations where

FIG. 1 represents the macrostructure of the tube made of the alloy of Zr-1.0Nb-1.5Sn-0.4Fe after operations of quenching, mechanical processing and tempering according to the method of the invention;

THE EMBODIMENTS OF THE METHOD

Figure 2B:
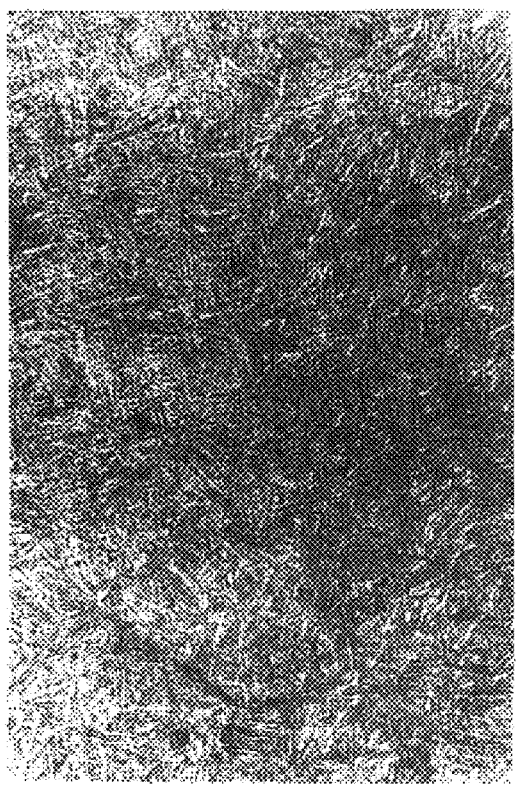
FIG. 2 represents the macro- and microstructure of the tube made of the alloy of Zr-1.0Nb 1.5Sn-0.4Fe after the first rolling and annealing according to the method of the invention.
Figure 2C:
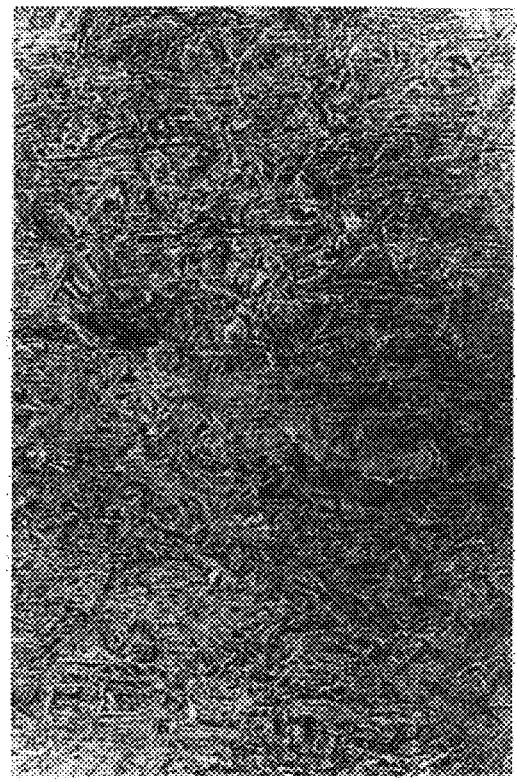
Figure 3A:
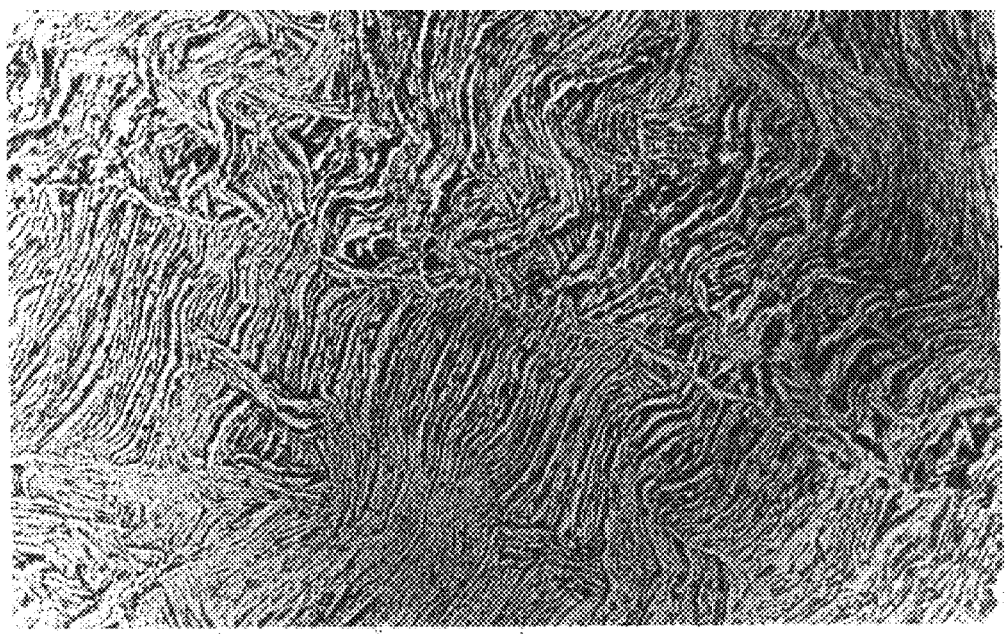
FIG. 3 shows the microstructure of the Zr-1.0Nb alloy tube after operations of pressing and annealing (the existing method).
Figure 3B:
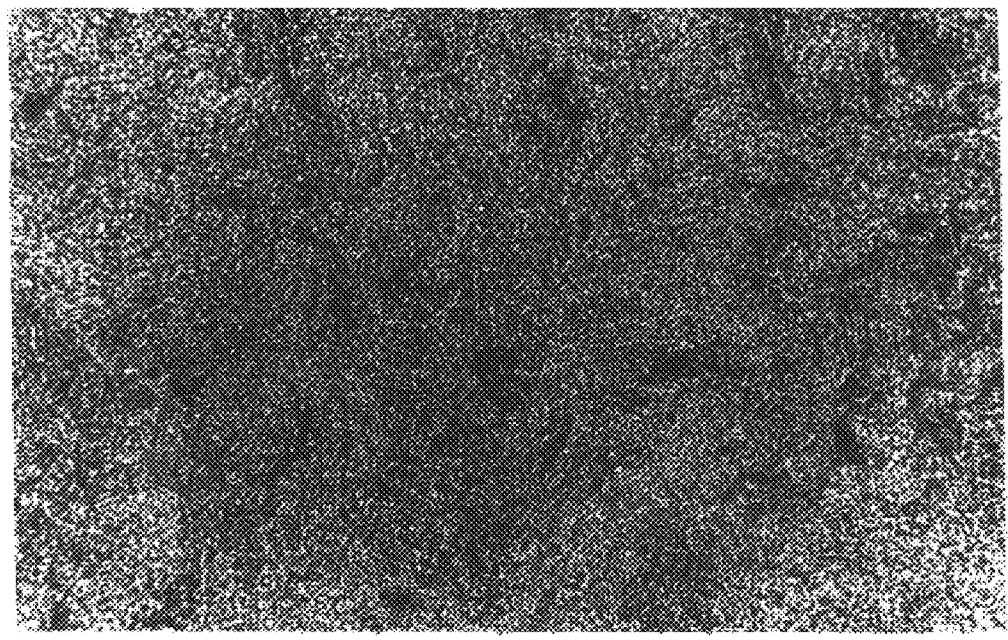
Figure 4A:
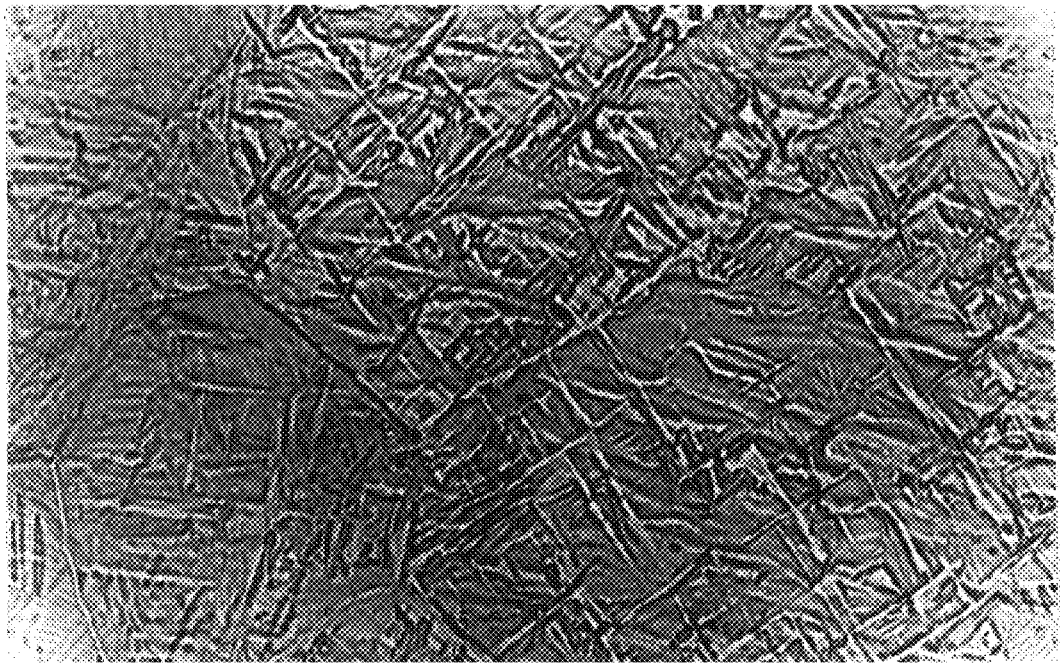
FIG. 4 shows the microstructure of the Zr-1.0Nb tube after the operations of pressing, quenching, mechanical processing and tempering (the method of the invention).
Figure 4B:
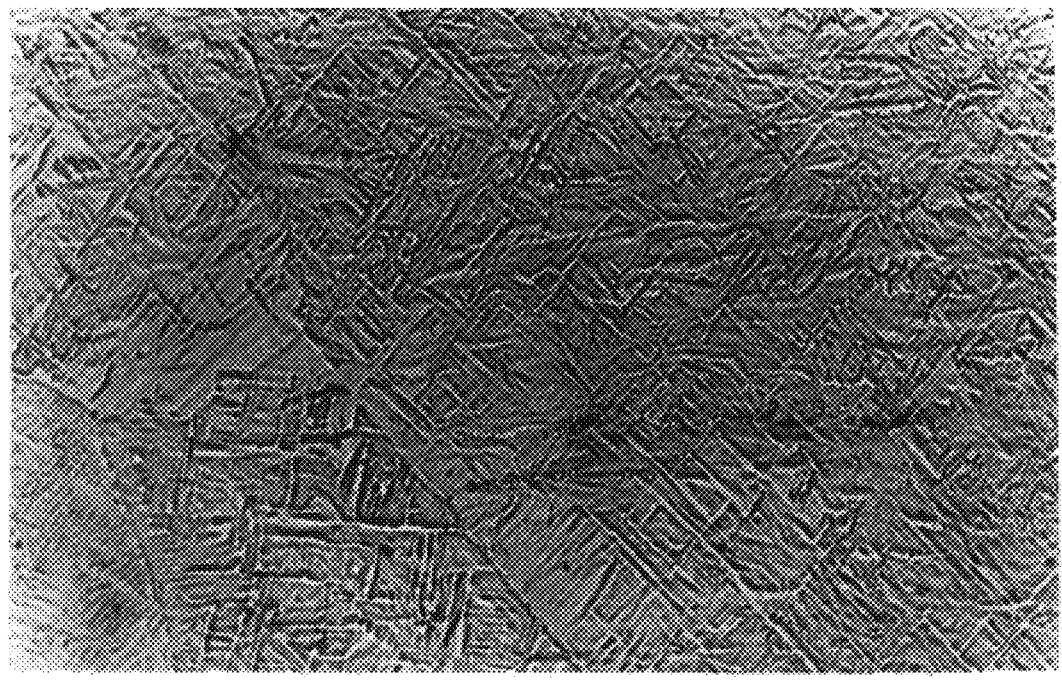

Variant 1. The manufacturing of tubular intermediate products of TREX type of zirconium alloy of Zr-1.0Nb.

The ingot was subjected to hot treatment to form a billet by means of the forging hammer at the temperature of the existence of $\beta$-zirconium. After mechanical processing the billet was hot pressed to form a sleeve in temperature range of 580 to 650° C. The produced sleeve was subjected to cold deformation in the tube cold rolling mill in three stages to form the final size tube intermediate product with the total reduction of $\mu_\Sigma=30$, the reduction at the first stage of the rolling being $\mu=1.9$. The intermediate and final thermal treatments of the intermediate products were conducted in the temperature range of 560 to 600° C.

Variant 2. The manufacturing of tubes of zirconium alloy of Zr-1.0Nb.

The ingot was subjected to form a billet by means of the screw rolling mill at the temperature of the existence of $\beta$-zirconium, after mechanical processing the billet was treated by hot pressing to form a sleeve in the temperature of 580 to 650° C. The produced sleeve was subjected to quenching at the temperature of 910 to 940° C., mechanical processing and the subsequent tempering at the temperature of 560 to 580° C. The tempered billet was subjected to six-stage cold deformation with intermediate thermal treatments to form the final size tubes with the total reduction of $\mu_\Sigma=313$, the reduction at the first stage of rolling being $\mu=1.9$. The intermediate and final thermal treatments of the products were conducted in the temperature range of 560 to 600° C.

Variant 3. The manufacturing of tubular intermediate products of SUPER-TREX type of zirconium alloy of Zr-1.0Nb-1.5Sn-0.4Fe.

The ingot was subjected to hot treatment to form a billet by means of the screw rolling mill at the temperature of the existence of $\beta$-zirconium. The billet was subjected to hot pressing to form a sleeve in the temperature range of 600 to 650° C. after mechanical processing. The produced sleeve was quenched at the temperature of 930 to 960° C., subjected to mechanical processing and the subsequent tempering at the temperature of 560 to 600° C. The tempered billet was subjected to cold deformation at the tube cold rolling null in two stages to form the final size tubular intermediate product with the total reduction of $\mu_\Sigma=20$, the reduction at the first stage of rolling being $\mu_\Sigma=1.75$. The intermediate and final thermal treatments of the intermediate products were conducted in the temperature range of 540 to 600° C.

Variant 4. The manufacturing of tubes of zirconium alloy of Zr-1.0Nb-1.5Sn-0.4Fe. The ingot was subjected to hot treatment to form a billet by means of a screw rolling null at the temperature of the existence of $\beta$-zirconium, the billet was subjected to hot pressing to form a sleeve in the temperature range of 650 to 750° C. after mechanical processing. The produced sleeve was quenched at the temperature of 930 to 960° C. and subjected to mechanical processing and the subsequent tempering at the temperature of 580 to 600° C. The tempered billet was subjected to five-stage cold deformation with intermediate thermal treatments to form the final size tubes with the total reduction of $\mu_\Sigma=165$, the reduction at the first stage being $\mu=1.75$. Intermediate and final treatments of the tubes were conducted in the temperature range of 540 to 620° C.

INDUSTRIAL APPLICABILITY

The described examples of the production of tubes according to the method of the invention and the examples of the production of similar articles within the existing method show that the method of the invention provides the production of articles of multi-component and binary alloys without any failures and of higher quality. Besides the method of the invention , as distinct from the existing method allows to produce articles of different zirconium alloys from binary to multi-component ones. The said method is applicable to a wider range of articles as compared with the existing method, and that is obviously illustrated by the obtained values of the total reduction during the cold rolling of tubes, up to $\mu_\Sigma=313$ within the method of the invention and $\mu_\Sigma<50$ within the existing method.

Currently experimental production tests on production of articles and intermediate products of zirconium alloys with the application of the method of the invention are underway at the Joint Stock company "Chepetsky Mechanical Plant".

TABLE

| Variants | Properties of the intermediate products Impact strength of the tubular billet before the first cold rolling, kJ/m. | Presence of microcracks after the first cold rolling | Properties of the ready tubes The size of the majority of intermetallic particles, μm | Properties of the ready tubes Lengthening in the axial direction, % | Properties of the ready tubes increase of weight in the water of the autoclave, mg/dm. Tests at 400° C., 72 h. |
|---|---|---|---|---|---|
| 1. | 870 + 15 | no | — | 52.0 | 14.0 |
| 2. | 720 + 15 | no | — | 49.5 | 13.5 |
| 3. | 575 + 15 | no | 0.1 | 41.0 | 17.7 |
| 4. | 575 + 15 | no | 0.1 | 46.8 | 18.0 |
| Existing method | 170 + 15 | yes | 0.13 | 38.0 | 19.6 + 0.9 |
| Existing method | 230 + 15 | yes | 0.1 | 47.0 | 18.8 + 0.8 |

What is claimed is:

1. A method of manufacturing a tubular article made of binary zirconium alloys from an initial zirconium alloy billet obtained by β-deformation processing of an ingot, the method comprising in the following order:
   a) molding the initial billet while it exists in an α phase to form a tubular billet having a cross-sectional area $S_{billet}$;
   b) roll forming the tubular billet to produce a first intermediate tube having a cross-sectional area $S_{tube}$ so that $\mu<2.0$ wherein $\mu=S_{billet}/S_{tube}$;
   c) annealing the first intermediate tube while it exists in an α phase; and
   d) roll forming and annealing the first intermediate tube at least once more to produce an intermediate tube product having a final cross-sectional area $S_{ready\ tube}$ so that $\mu_\Sigma<50$ wherein $\mu_\Sigma=S_{billet}/S_{ready\ tube}$.

2. A method of manufacturing a tubular article made of zirconium alloys having at least two alloying elements from an initial zirconium alloy billet obtained by β-deformation processing of an ingot, the method comprising in the following order:
   a) molding the initial billet while it exists in either an α phase or an (α+β) phase to form a tubular billet having a cross-sectional area $S_{billet}$;
   b) quenching the tubular billet at 30°–60° Celsius above a transition temperature where an (α+β) phase transforms to β phase;
   c) roll forming the tubular billet to produce a first intermediate tube having a cross-sectional area $S_{tube}$ from the tubular billet so that $\mu<2.0$ wherein $\mu=S_{billet}/S_{tube}$;
   d) annealing the first intermediate tube while it exists in an α phase; and
   e) roll forming and annealing the first intermediate tube at least once more to produce an intermediate tube product having a final cross-sectional area $S_{ready\ tube}$ so that $\mu_\Sigma<50$ wherein $\mu_\Sigma=S_{billet}/S_{ready\ tube}$.

3. The method of claim 2 further comprising mechanically processing the tubular billet after it is quenched then tempering the tubular billet while it exists in an α phase.

4. A method of manufacturing a tubular article made of binary zirconium alloy from an initial zirconium alloy billet obtained by β-deformation processing of an ingot, the method comprising in the following order:
   a) molding the initial billet while it exists in either an α phase or an (α+β) phase to form a tubular billet having a cross-sectional area $S_{billet}$;
   b) quenching the tubular billet at 30°–60° Celsius above a transition temperature where an (α+β) phase transforms to a β phase;
   c) roll forming the tubular billet to produce a first intermediate tube having a cross-sectional area $S_{tube}$ from the tubular billet so that $\mu<2.0$ wherein $\mu=S_{billet}/S_{tube}$;
   d) annealing the first intermediate tube while it exists in an α phase; and
   e) roll forming and annealing the first intermediate tube at least once more to produce an intermediate tube product having a final cross-sectional area $S_{ready\ tube}$ so that $\mu_\Sigma<50$ wherein $\mu_\Sigma=S_{billet}/S_{ready\ tube}$.

5. The method of claim 4 further comprising mechanically processing the tubular billet after it is quenched then tempering the tubular billet while it exists in an α phase.

6. A method of manufacturing a tubular article made of binary zirconium alloys from an initial zirconium alloy billet obtained by β-deformation processing of an ingot, the method comprising in the following order:
   a) molding the initial billet while it exists in an α phase to form a tubular billet having a cross-sectional area $S_{billet}$;
   b) roll forming the tubular billet to produce a first intermediate tube having a cross-sectional area $S_{tube}$ so that $\mu<2.0$, where $\mu=S_{billet}/S_{tube}$;
   c) annealing the first intermediate tube while it exists in an α phase; and
   d) roll forming and annealing the first intermediate tube to produce a final tube product having a final cross-sectional area $S_{ready\ tube}$ so that $\mu_\Sigma>100$, where $\mu_\Sigma=S_{billet}/S_{ready\ tube}$.

7. A method of manufacturing a tubular article made of zirconium alloys having at least two alloying elements from an initial zirconium alloy billet obtained by β-deformation processing of an ingot, the method comprising in the following order:
   a) molding the initial billet while it exists in an α phase or (α+β) phase to form a tubular billet having a cross-sectional area $S_{billet}$;
   b) quenching the tubular billet at 30°–60° Celsius above a transition temperature where an (α+β) phase transforms to a β phase;
   e) roll forming the tubular billet to produce a first intermediate tube having a cross-sectional area $S_{tube}$ so that $\mu<2.0$, where $\mu=S_{billet}/S_{tube}$;

f) annealing the first intermediate tube while it exists in an α phase; and c) roll forming and annealing the first intermediate tube to produce a final tube product having a final cross-sectional area $S_{ready\ tube}$ so that $\mu_\Sigma > 100$, where $\mu_\Sigma = S_{billet}/S_{ready\ tube}$.

8. The method of claim 7 further comprising mechanically processing the tubular billet after it is quenched then tempering the tubular billet while it exists in an α phase.

9. A method of manufacturing a tubular article made of binary zirconium alloy from an initial zirconium alloy billet obtained by β-deformation processing of an ingot, the method comprising in the following order:

a) molding the initial billet while it exists in an α phase or (α+β) phase to form a tubular billet having a cross-sectional area $S_{billet}$;

b) quenching the tubular billet at 30°–60° Celsius above a transition temperature where an (α+β) phase transforms to a β phase;

g) roll forming the tubular billet to produce a first intermediate tube having a cross-sectional area $S_{tube}$ so that $\mu < 2.0$, where $\mu = S_{billet}/S_{tube}$;

h) annealing the first intermediate tube while it exists in an α phase; and c) roll forming and annealing the first intermediate tube to produce a final tube product having a final cross-sectional area $S_{ready\ tube}$ so that $\mu_\Sigma > 100$, where $\mu_\Sigma = S_{billet}/S_{ready\ tube}$.

10. The method of claim 9 further comprising mechanically processing the tubular billet after it is quenched then tempering the tubular billet while it exists in an α phase.

* * * * *

UNITED STATES PATENT AND TRADEMARK OFFICE
CERTIFICATE OF CORRECTION

PATENT NO. : 6,368,429 B1
DATED : April 9, 2002
INVENTOR(S) : Zavodchikov et al.

It is certified that error appears in the above-identified patent and that said Letters Patent is hereby corrected as shown below:

<u>Title page,</u>
Item [73], Assignee, insert the letter -- t -- after the word "Plan." The word should be -- Plant. --

Signed and Sealed this

Eighteenth Day of February, 2003

JAMES E. ROGAN
*Director of the United States Patent and Trademark Office*